(12) United States Patent  
Gil et al.

(10) Patent No.: US 12,092,902 B2  
(45) Date of Patent: Sep. 17, 2024

(54) HEAD-MOUNTED DEVICE CONFIGURED TO IDENTIFY A DEVICE WITHIN A SPECIFIC DISTANCE, AND METHOD OF OPERATION

(71) Applicant: Essilor International, Charenton-le-Pont (FR)

(72) Inventors: Paul Gil, Charenton-le-Pont (FR); Aurélie Le Cain, Charenton-le-Pont (FR); Björn Drobe, Singapore (SG); Cedric Gilbert, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 678 days.

(21) Appl. No.: 16/751,756

(22) Filed: Jan. 24, 2020

(65) Prior Publication Data

US 2020/0241321 A1   Jul. 30, 2020

(30) Foreign Application Priority Data

Jan. 25, 2019   (EP) ................................. 19305101

(51) Int. Cl.
*G02C 7/02*    (2006.01)
*G02B 27/01*   (2006.01)
*G02C 7/06*    (2006.01)
*G02C 7/08*    (2006.01)
*G02C 7/10*    (2006.01)
*G06K 7/00*    (2006.01)
(Continued)

(52) U.S. Cl.
CPC ........... *G02C 7/027* (2013.01); *G02B 27/017* (2013.01); *G02C 7/028* (2013.01); *G02C 7/061* (2013.01);
(Continued)

(58) Field of Classification Search
CPC ..... A61B 3/0025; A61B 5/1118; G01C 21/16; G01C 21/20; G01S 1/02; G01S 5/0221;
(Continued)

(56) References Cited

U.S. PATENT DOCUMENTS 8,890,657 B2   11/2014   Lin et al.
10,149,958 B1  12/2018   Tran et al.
(Continued)

FOREIGN PATENT DOCUMENTS

CN    103429106 A    12/2013
CN    105452941 A    3/2016
(Continued)

OTHER PUBLICATIONS

Extended EP Search Report, dated Jul. 8, 2019, from corresponding EP application No. 19 30 5101.8.
(Continued)

*Primary Examiner* — Stephen R Burgdorf
(74) *Attorney, Agent, or Firm* — NIXON & VANDERHYE

(57) ABSTRACT

Disclosed is a method implemented with a head-mounted device for identifying a distinct device within a given range distance of the head-mounted device, the head-mounted device includes a receiver adapted to receive wireless signals and a memory adapted to store data. The method includes: a tag data receiving step during which tag data identifying at least one electronic wireless tag placed on the distinct device are received by the receiver of the head-mounted device; a storing step during which the stored data including the tag data are stored in the memory of the head-mounted device; and an identification step during which the device is identified based on the stored data.

13 Claims, 2 Drawing Sheets

(51) Int. Cl.
  *G06K 7/10* (2006.01)
  *H04B 1/3827* (2015.01)
  *H04B 5/77* (2024.01)
  *H04W 4/02* (2018.01)
  *H04W 4/80* (2018.01)

(52) U.S. Cl.
  CPC ............. *G02C 7/083* (2013.01); *G02C 7/101* (2013.01); *G06K 7/00* (2013.01); *G06K 7/10* (2013.01); *G06K 7/10099* (2013.01); *G06K 7/10386* (2013.01); *G06K 7/10396* (2013.01); *H04B 1/385* (2013.01); *H04B 5/77* (2024.01); *H04W 4/023* (2013.01); *H04W 4/80* (2018.02); *G02B 2027/0138* (2013.01); *G02B 2027/014* (2013.01)

(58) Field of Classification Search
  CPC .............. G02B 27/017; G02B 27/0172; G02B 2027/0138; G02B 2027/014; G02C 7/027; G02C 7/028; G02C 7/061; G02C 7/083; G02C 7/101; G02C 11/10; G03H 1/00005; G06F 3/011; G06F 3/1454; G06F 21/32; G06K 7/00; G06K 7/0008; G06K 7/10; G06K 7/10099; G06Q 30/0621; G06T 19/006; H04B 1/385; H04B 5/0062; H04W 4/008; H04W 4/023; H04W 4/80
  USPC ........................................ 340/13.26
  See application file for complete search history.

(56) References Cited

U.S. PATENT DOCUMENTS

| | | | | |
|---|---|---|---|---|
| 2004/0156021 | A1* | 8/2004 | Blum | G02C 7/101 351/233 |
| 2008/0191846 | A1 | 8/2008 | Chang | |
| 2010/0328073 | A1* | 12/2010 | Nikitin | G06K 7/0008 340/572.1 |
| 2011/0102149 | A1* | 5/2011 | Lin | G06K 7/10079 340/10.1 |
| 2012/0075076 | A1* | 3/2012 | Wang | G06K 7/10366 340/384.1 |
| 2012/0310339 | A1* | 12/2012 | Berge | G02C 7/085 623/6.22 |
| 2013/0110264 | A1* | 5/2013 | Weast | H04B 1/385 700/91 |
| 2013/0321168 | A1 | 12/2013 | Mahony et al. | |
| 2015/0049002 | A1* | 2/2015 | Ishikawa | G02B 27/0179 345/8 |
| 2015/0138427 | A1* | 5/2015 | Kennedy | G01S 5/0263 348/345 |
| 2016/0161766 | A1 | 6/2016 | Archambeau et al. | |
| 2016/0202081 | A1 | 7/2016 | Debieuvre et al. | |
| 2016/0223986 | A1* | 8/2016 | Archambeau | G03H 1/2294 |
| 2018/0128685 | A1* | 5/2018 | Peloux | G01M 11/0257 |
| 2018/0167549 | A1 | 6/2018 | Lim et al. | |
| 2018/0338709 | A1* | 11/2018 | Krans | A61B 5/1118 |

FOREIGN PATENT DOCUMENTS

| | | | |
|---|---|---|---|
| CN | 105518416 A | 4/2016 | |
| CN | 108020921 A | 5/2018 | |
| EP | 3258308 A1 * | 12/2017 | ......... G02B 27/0101 |
| WO | 2011/053442 A1 | 5/2011 | |

OTHER PUBLICATIONS

Office Action and Search Report issued in Chinese Patent Application No. 202010073283.8 dated Dec. 2, 2022.
Office Action issued in Chinese Patent Application No. 202010073283.8 dated Jun. 30, 2023.

* cited by examiner

HEAD-MOUNTED DEVICE CONFIGURED TO IDENTIFY A DEVICE WITHIN A SPECIFIC DISTANCE, AND METHOD OF OPERATION

FIELD OF THE INVENTION

The invention relates to a method for identifying a distinct device within a given range of a head-mounted device.

Additionally, the invention relates to a head-mounted device comprising a processor adapted to carry the method of the invention, and to a system comprising said head-mounted device and at least an electronic wireless tag.

BACKGROUND OF THE INVENTION

Being able to determine the activity of a person, or its environment is an essential parameter that may help to enhance said person's performances, comfort, or security.

Usually, systems used to determine a person's environment or activity require complex technical means. Additionally, such common systems often lack reliability due to the multiplicity of possible environments/activity.

For example, Clouclip is selling a device allowing to detect the proximity of an electronic screen. However, such technology does not permit to identify an object within proximity.

Therefore there is a need to provide an accurate and simple method to determine and identify a device within proximity of a person, and a person's environment or activity.

SUMMARY OF THE INVENTION

To this end, the invention proposes a method implemented with a head-mounted device for identifying a distinct device within a given range distance of the head-mounted device, the head-mounted device comprises receiving means adapted to receive wireless signals and a memory adapted to store data, the method comprising:
  a tag data receiving step during which tag data identifying at least one electronic wireless tag placed on the distinct device are received by the receiving means of the head-mounted device,
  a storing step during which the stored data comprising the tag data are stored in the memory of the head-mounted device,
  an identification step during which the device is identified based on the stored data.

Advantageously, the method according to the invention allows to accurately identify a device within a predefined range of the head-mounted device.

According to further embodiments which can be considered alone or in combination:
  the method further comprises a distance determining step during which the distance between the head-mounted device and the distinct device is determined based on the received tag data, and wherein the determined distance is stored in the memory of the head-mounted device, so that the stored data further comprise distance data; and/or
  the method further comprises an angle determining step during which the angle between the head-mounted device and at least two electronic tags placed on the distinct device is determined based on the received tag data, and wherein the determined angle is stored in the memory of the head-mounted device, so that the stored data further comprise angle data; and/or
  the method further comprises an angle determining step during which the angle between at least two receiving means of the head-mounted device and an electronic tag placed on the distinct device is determined based on the received tag data, and wherein the determined angle is stored in the memory of the head-mounted device, so that the stored data further comprise angle data; and/or
  the method further comprises a viewing distance determining step during which the viewing distance of a wearer of the head-mounted device is determined based on the stored data; and/or
  the method further comprises an environment determining step during which environment data are determined based on the received tag data, and wherein the determined environment data are stored in the memory of the head-mounted device, so that the stored data further comprise environment data; and/or
  the method further comprises an activity determining step during which the activity of a wearer is determined based on the stored data, and wherein the determined activity is stored in the memory of the head-mounted device, so that the stored data further comprise activity data; and/or
  the head-mounted device further comprises a function controller adapted to control at least one function of the head-mounted device; and/or
  the method further comprises a function modifying step during which said at least one function of the head-mounted device is modified based on the stored data; and/or
  the modification of the function of the head-mounted device comprises acting on the activation of said function; and/or
  the modification of the function of the head-mounted device comprises adapting the function; and/or
  the at least one function of the head-mounted device comprises at least a notification function adapted to send a notification to the wearer; and/or
  the head-mounted device further comprises at least a controllable active optical lens,
  the function of the head-mounted device modified during the function modifying step is the optical function of the active optical lens; and/or
  the modified active optical function is an active transmission function and wherein during the function modifying step the transmission function is modified based on the stored data; and/or
  the modified active optical function is an active dioptric function and wherein during the function modifying step the dioptric function is modified to be adapted to the wearer based on the stored data; and/or
  the modified active optical function is an active polarization function and wherein during the function modifying step the polarization function is modified to be adapted to the wearer based on the stored data; and/or
  the method further comprises a data processing step during which the stored data are processed to determine at least part of a visual profile of the wearer of the head-mounted device; and/or
  the wireless signals received by the head-mounted device comprise Bluetooth and/or Wifi and/or NFC and/or LoRa and/or SigFox and/or radio and/or electromagnetic field signals Another object of the invention relates to a head-mounted device comprising one or more stored sequences of instructions that are accessible to a processor, and which, when executed by the processor, causes the processor to carry out a method comprising:

a tag data receiving step during which tag data identifying an electronic wireless tag placed on the distinct device are received by the receiving means of the head-mounted device, a storing step during which the stored data comprising the tag data are stored in the memory of the head-mounted device.

an identification step during which the device is identified based on the stored data.

According to further embodiments which can be considered alone or in combination:

the head-mounted devices further comprises emitting means; and/or the head-mounted devices further comprises receiving means.

The invention further relates to a system comprising:

at least an electronic wireless tag, the at least one electronic tag emitting an identifying wireless signal, at least a head-mounted device comprising:

receiving means adapted to receive the tag data, the tag data corresponding to the received wireless signals of the electronic wireless tag, and a memory adapted to store the received tag data and comprising an executable program that when executed allows to identify the electronic wireless tag based on the received tag data.

BRIEF DESCRIPTION OF THE DRAWINGS

Embodiments of the invention will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help to improve the understanding of the embodiments of the present invention.

DETAILED DESCRIPTION OF EMBODIMENTS OF THE INVENTION

The invention relates to a method implemented with a head-mounted device for identifying a distinct device within a given range distance of the head-mounted device.

Figure 1:
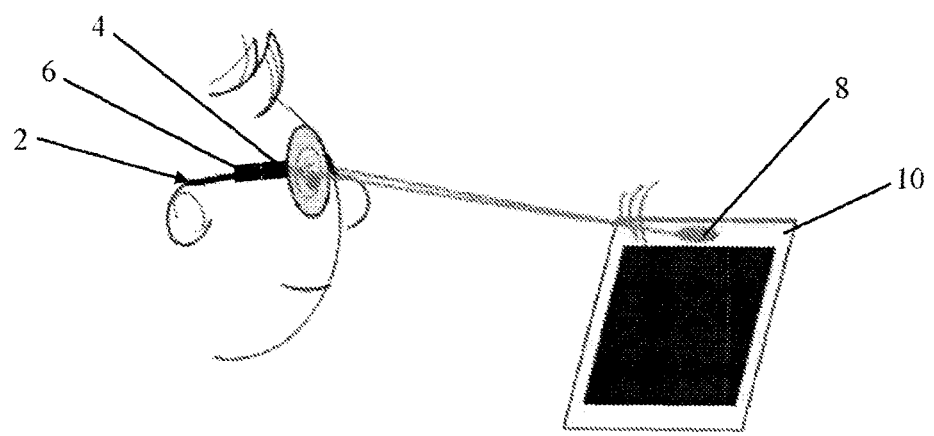
FIG. 1 illustrates a head-mounted device receiving tag data emitted by an electronic Bluetooth tag placed on a device.

As illustrated on FIG. 1, the head-mounted device 2 comprises receiving means 4. The receiving means 4 are adapted to receive signals, such as for example wireless signals emitted by an electronic wireless tag 8.

Intrinsic properties of the receiving means 4 and the electronic wireless tag 8 define a maximal range distance in which a distinct device can be identify. For example, such predefined range distance may be limited by the sensibility of the receiving means or the power of the wireless signal emitted by the electronic wireless tag 8.

The wireless signals may comprise signals such Bluetooth and/or Wifi and/or Near Field Communication (NFC) and/or Long Range Wide-Area Network (LoRa or LoRaWAN) and/or Low Power Wide-Area Network (SigFox) and/or radio and/or electromagnetic fields signals.

The wireless signals are beacon signals. In the sense of the invention, beacon signals are signals that indicate the proximity or location of a device or its readiness to perform a task.

The head-mounted device further comprises a memory 6. The memory 6 of the head-mounted is adapted to store data, such as for example the data received by the receiving means 4 of the head-mounted device 2.

Advantageously, the electronic wireless tags 8 are placed on a distinct devices 10 and emit a specific wireless signal that allows identifying said distinct device 10.

Figure 2:
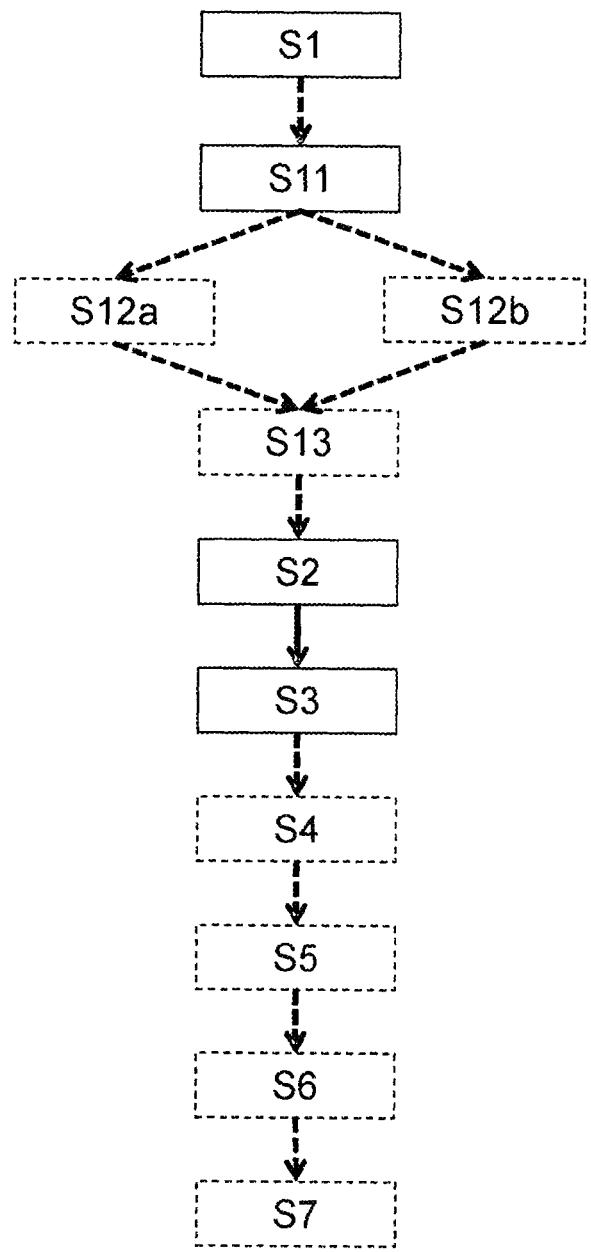
FIG. 2 illustrates a chart-flow embodiment of the method for identifying a distinct device within a given range distance of a head-mounted device.

As illustrated on FIG. 2, the method for identifying a distinct device according to the invention comprises a step S1 of receiving tag data. The tag data are received by the receiving means of the head-mounted device.

The tag data correspond to the wireless signals emitted by at least one electronic wireless tag placed on a distinct device.

The electronic wireless tag placed on a distinct device may be a passive electronic wireless tag. A passive electronic wireless tag only emits an identifying signal which is specific to said passive electronic wireless tag.

Alternatively, the electronic wireless tag placed on a distinct device may be an active electronic wireless tag. An active electronic wireless tag may process data and emit data, such as for example the processed data or an identifying signal.

The method for identifying a distinct device according to the invention further comprises a step S2 of storing the received data. The received data are stored in the memory of the head-mounted device.

The received data comprises at least the tag data received by the receiving means of the head-mounted device.

The method for identifying a distinct device according to the invention further comprises a step S3 of identifying a device. The device is identified based on the stored data.

The stored data comprises at least the tag data stored in the memory of the head-mounted device.

Advantageously, the method according to the invention allows to accurately identify a device within a predefined range of the head-mounted device.

Alternatively, the method for identifying a distinct device may comprise prior to the tag data receiving step, a calibrating step during which the head-mounted device and the at least one electronic wireless tag are calibrated.

The method for identifying a distinct device may further comprise a distance determining step S11. The distance between the head-mounted device and the distinct device is determined based on the received tag data.

During the distance determining step S11, tag data received by the receiving means of the head-mounted device are analyzed so as to determine a distance between the head-mounted device and the distinct device on which the electronic wireless tag is placed.

With reference to FIG. 2, at least one receiving mean of the head-mounted device receives a wireless signal emitted by at least an electronic wireless tag placed on a distinct device. Knowing the intrinsic characteristics of the receiving mean of the head-mounted device receiving the wireless signal and the intrinsic characteristics of the electronic wireless tag, using basic calculation methods, the position of the electronic wireless tag may be determined, and thus the distance between the distinct device and the head-mounted device can be determined.

Alternatively, the distance between the distinct device and the head-mounted device may be determined using basic triangulation calculation between at least one receiving mean of the head-mounted device receiving wireless signals emitted by at least two electronic wireless tags placed on a single distinct device, or between at least two receiving means of the head-mounted device receiving wireless signals emitted by at least one electronic wireless tag placed on a single distinct device The determined distance is further stored in the memory of the head-mounted device. The determined distance stored in the memory corresponds to the distance data.

According to an embodiment of the invention illustrated on FIG. 2, the method for identifying a distinct device may comprise an angle determining step S12a.

During the angle determining step S12a, the angle between at least one receiving mean of the head-mounted device and at least two electronic wireless tags placed on at least one distinct device is determined based on the received tag data.

Figure 3A:
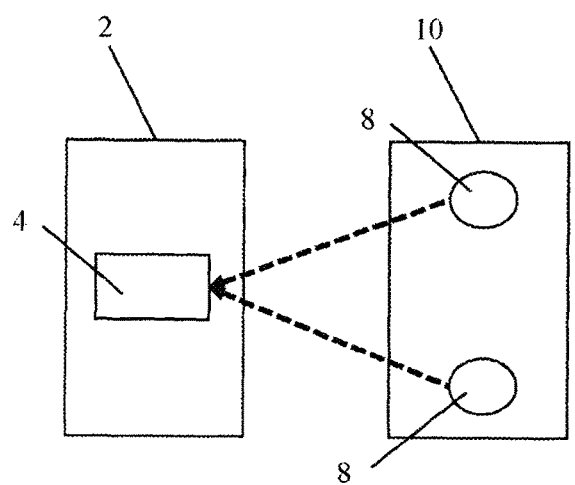
FIGS. 3A and 3B illustrate alternatives of a head-mounted device receiving tag data emitted by electronic wireless tags placed on a device.

With reference to FIG. 3A, tag data emitted by at least two electronic wireless tags 8 are received by at least one receiving mean 4 of the head-mounted device 2. The tag data are further analyzed so as to determine an angle between said at least one receiving mean 4 and the at least two electronic wireless tags 8, and thus between the head-mounted device 2 and the distinct device 10 on which the at least two electronic wireless tags 8 are placed.

The determined angle is further stored in the memory of the head-mounted device. The determined angle stored in the memory corresponds to the angle data.

According to another embodiment of the invention illustrated on FIG. 2, the method for identifying a distinct device may comprise an angle determining step S12b.

During the angle determining step S12b, the angle between at least two receiving means of the head-mounted device and at one electronic wireless tag placed on at least one distinct device is determined based on the received tag data.

Figure 3B:
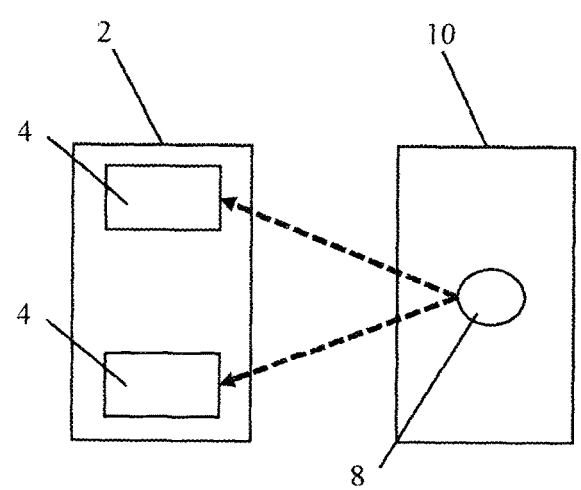

With reference to FIG. 3B, tag data emitted by at least one electronic wireless tag 8 is received by at least two receiving means 4 of the head-mounted device 2. The tag data are further analyzed so as to determine an angle between said at least two receiving means 4 and the at least one electronic wireless tag 8, and thus between the head-mounted device 2 and the distinct device 10 on which the at least one electronic wireless tags is placed.

The determined angle is further stored in the memory of the head-mounted device. The determined angle stored in the memory corresponds to the angle data.

According to an embodiment of the invention illustrated on FIG. 2, the method for identifying a distinct device may comprise an environment determining step S13.

During the environment determining step S13, environment data are determined based on the received tag data. The environment data are indicative of the environment of the person.

The environment data may relate to any parameter of the environment of the person that may have an impact on the behavior of the person wearing the head-mounted device, in particular on the visual behavior of said person.

For example, the environment data may relate to spectral features and intensity of the light received by the person. Furthermore, the environment data may relate to temperature and/or humidity of the environment of the person, the amount and/or the type of allergens and/or pollutants contained in the environment of the person and/or an indication of the localization of the person such as indoor or outdoor and/or the place of carrying out an activity of the person, proximity to relief and/or water, etc.

The determined environment data are further stored in the memory of the head-mounted device so that the stored data further comprise environment data.

With reference to FIG. 2, the method for identifying a distinct device may comprise an activity determining step S4.

During the activity determining step S4, activity data are determined based on the identified device and the stored data. The activity data are indicative of the activity carried on by the person wearing the head-mounted device. Furthermore, the activity data may be indicative of the time spent by the wearer of the head-mounted device doing said activity.

The activity carried on by the person wearing the head-mounted device may be for example, but not limited to, driving, sport, playing golf, playing tennis, practicing archery, reading, teeth brushing, paragliding, etc.

The determined activity data are further stored in the memory of the head-mounted device so that the stored data further comprise activity data.

With reference to FIG. 2, the method for identifying a distinct device may further comprise a viewing distance determining step S5.

During the viewing distance determining step S5, the viewing distance of a person wearing the head-mounted device is determined based on the stored data. The stored data may comprise tag data, and/or distance data, and/or angle data, and/or environment data, and/or activity data.

In the sense of the invention, the viewing distance corresponds to the distance between the person wearing the head-mounted device and the object seen by said person.

The head-mounted device comprising receiving means adapted to receive wireless signals and a memory adapted to store data may further comprise a function controller adapted to control at least one function of said head-mounted device.

The controllable function of the head-mounted device may relate to an optical function, a recording function, or a notification function.

For example, the function of the head-mounted device may be a recording function controlling an activable camera placed on the head-mounted device.

As illustrated on FIG. 2, the method for identifying a distinct device may further comprise a function modifying step S6.

During the function modifying step S6, at least one function of the head-mounted is modified based on the stored data. The controllable function is controlled by a function controller of the head-mounted device.

For example, the head-mounted device may identify that the wearer is using a distinct device comprising a wireless tag and modify a controllable function of said head-mounted device to adapt it to the utilization of said device.

According to an embodiment of the invention, the at least one function of the head-mounted device may be modified based on the stored data when at least two distinct devices comprising a wireless tag are identified by the head-mounted device.

According to an embodiment of the invention, the modification of the function of the head-mounted device comprises acting on the activation of a controllable function of the head-mounted device.

According to another embodiment of the invention, the modification of the function of the head-mounted device comprises adapting said controllable function.

The at least one function of the head-mounted device modified during the function modifying step may comprise at least a notification function.

The function controller of the head-mounted device may modify or activate/deactivate the notification function of the head-mounted device during the function modifying step based on the stored data.

In the sense of the invention, the notification function corresponds to a function adapted to send a notification to the person wearing the head-mounted device.

For example, the notification function may emit a sound signal, and/or a visual signal, and/or a vibration signal to the wearer of the head-mounted device.

For example, the head-mounted device may receive tag data identifying the driver seat of a car. Based on the received tag data stored in the memory, the head-mounted may determine that the wearer of the head-mounted device is driving a car. Based on such data, the controller of the head-mounted device may turn off the notification function of the head-mounted device that for example emits a sound every time the wearer receives an email.

The head-mounted device may further comprise at least a controllable active lens.

The at least one function of the head-mounted device modified during the function modifying step may comprise at least an optical function.

The function controller of the head-mounted device may modify the optical function of the controllable active lens of the head-mounted device during the function modifying step based on the stored data.

In the sense of the invention, the optical function corresponds to a function providing for each gaze direction the effect of the optical lens on the light ray passing through the optical lens.

For example, the head-mounted device may receive tag data identifying for example a screen. Based on the received tag data that are stored in the memory, the head-mounted may determine that the wearer of the head-mounted device is looking at the screen and that the television is placed at for example 10 meters from the wearer. Based on such data, the controller of the head-mounted device may adapt the optical function of the controllable active lens to correct, for example, a myopia of the wearer.

The optical function may comprise dioptric function, light absorption, polarizing capability, reinforcement of contrast capacity, etc.

According to an embodiment of the invention, the modified optical function of the controllable active lens of the head-mounted device may correspond to a transmission function.

Accordingly, the function controller of the head-mounted device may modify the transmission function of the controllable active lens of the head-mounted device during the function modifying step based on the stored data.

Such transmission function may for example be adapted to filter a specific range of light ray.

For example, the head-mounted device may comprise a controllable active lens comprising an electrochromic function. In response to the identification of a device corresponding to the driver seat of a car and comprising a wireless tag, the head-mounted device may modify the electrochromic function so as to de-activate a class 4 electrochromic function.

According to another embodiment of the invention, the modified optical function of the controllable active lens of the head-mounted device may correspond to a dioptric function.

Accordingly, the function controller of the head-mounted device may modify the dioptric function of the controllable active lens of the head-mounted device during the function modifying step based on the stored data.

The dioptric function corresponds to the optical lens power (mean power, astigmatism etc.) as a function of the gaze direction.

According to another embodiment of the invention, the modified optical function of the controllable active lens of the head-mounted device may correspond to a polarization function.

Accordingly, the function controller of the head-mounted device may modify the polarization function of the controllable active lens of the head-mounted device during the function modifying step based on the stored data.

According to an embodiment of the invention, the head-mounted device comprises emitting means.

The function of the head-mounted device modified during the function modifying step may comprise at least a transmitting function.

For example, the head-mounted device identifying a device comprising a wireless tag and corresponding to a car may activate a transmitting function. Said transmitting function may transmit a signal to a connected device such as for example a smart watch to de-activate a pedometer function of said connected device.

For example, the head-mounted device identifying a device comprising a Bluetooth tag and corresponding to a bicycle may activate a transmitting function. Said transmitting function may transmit a signal to a connected device such as for example a smart watch to activate an activity tracking function of said connected device. The activity tracking function may for example measure and store the evolution of the heart rhythm of the wearer, and/or the amount of energy used by the wearer, and/or the distance covered.

According to an embodiment of the invention, the head-mounted device comprises a sensor.

The function of head-mounted device modified during the function modifying step may comprise at least a visual behavior recording function. The sensor of the head-mounted device may record in real time the visual behavior of the wearer. The visual behavior of the wearer may relate, for example to the eyelids activity of the user, such as opening frequency and force or shift in the near point of convergence. The visual behavior data recorded in real-time may further be stored in the stored data.

The head-mounted device may determine the level of fatigue of the user based on the stored visual behavior data.

For example, the head-mounted device identifying a device comprising a wireless tag and corresponding to a car may activate the visual behavior recording function to determine the level of fatigue of the wearer. Based on the determined level of fatigue, the head-mounted device may alert the wearer of the risk of driving a car in such state of fatigue.

As represented on FIG. 2, the method for identifying a distinct device may further comprise a data processing step S7.

During the data processing step S7, the stored data are processed to determine at least part of a visual profile of the wearer of the head-mounted device.

Another aspect of the invention relates to a head-mounted device comprising one or more sequences of instructions that are accessible to a processor. The sequences of instructions, when executed by the processor, cause the processor to carry out the method according to the invention for identifying a distinct device.

The head-mounted device may further comprise emitting and receiving means.

The invention further relates to a system comprising at least an electronic wireless tag and at least a head-mounted device.

The at least one electronic wireless tag emits at least a wireless signal. The at least one wireless signal allows identifying the electronic wireless tag.

The electronic wireless tag may be a passive electronic wireless tag. A passive electronic wireless tag only emits an identifying signal which is specific to said passive electronic wireless tag.

Alternatively, the electronic wireless tag may be an active electronic wireless tag. An active electronic wireless tag may process data and emit data, such as for example the processed data or an identifying signal.

The at least one head-mounted device comprises receiving means. The receiving means are adapted to receive the wireless signal of the electronic wireless tag. The received wireless signal corresponds to the tag data.

The at least one head-mounted device also comprises a memory. The memory is adapted to store the received tag data.

The memory further comprises an executable program that when executed allows to identify the electronic wireless tag based on the receive data.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method implemented with a head-mounted device configured to identify a distinct device within a specific range distance of the head-mounted device, the head-mounted device including a receiver configured to receive wireless signals, a memory configured to store data, a function controller configured to control at least one function of the head-mounted device and configured to control at least one controllable active optical lens, the method comprising:
receiving tag data identifying at least one electronic wireless tag placed on the distinct device by the receiver of the head-mounted device;
storing data comprising the tag data in the memory of the head-mounted device as stored data;
identifying the distinct device based on the stored data;
modifying the at least one function of the head-mounted device based on the stored data, the at least one modified function being an optical function of the controllable active optical lens;
determining an activity of a wearer based on the stored data, the determined activity being stored in the memory of the head-mounted device so that the stored data is updated to further comprise activity data; and
determining a determined angle between the head-mounted device and at least two electronic tags placed on the distinct device based on the received tag data, the determined angle being stored in the memory of the head-mounted device, so that the stored data is updated to further comprise the determined angle data,
wherein the at least one modified optical function is an active dioptric function, and
wherein, during the function modifying, the active dioptric function is modified to be adapted to the wearer based on the stored data.

2. The method according to claim 1, further comprising determining a distance between the head-mounted device and the distinct device based on the received tag data, the determined distance being stored in the memory of the head-mounted device, so that the stored data is updated to further comprise distance data.

3. The method according to claim 1, further comprising determining another angle between at least two receivers of the head-mounted device and an electronic tag placed on the distinct device based on the received tag data, the determined other angle being stored in the memory of the head-mounted device, so that the stored data is updated to further comprise the other angle data.

4. The method according to claim 3, further comprising determining a viewing distance of the wearer of the head-mounted device based on the stored data.

5. The method according to claim 1, further comprising determining a viewing distance of the wearer of the head-mounted device based on the updated stored data.

6. The method according to claim 1, wherein the modifying the at least one function of the head-mounted device comprises acting on an activation of said function.

7. The method according to claim 1, wherein the modifying the at least one function of the head-mounted device comprises adapting the function.

8. The method according to claim 1, wherein the at least one function of the head-mounted device comprises at least one notification function configured to send a notification to the wearer.

9. The method according to claim 1, wherein the at least one modified optical function is an active transmission function, and
wherein, during the function modifying, the active transmission function is modified based on the stored data.

10. The method according to claim 1, further comprising processing the stored data to determine at least part of a visual profile of the wearer of the head-mounted device.

11. A head-mounted device comprising:
at least one controllable active lens;
a function controller configured to control at least one function of the head-mounted device;
a receiver configured to receive signals;
a processor; and
a memory configured to store one or more sequences of instructions that are accessible to the processor, and which, when executed by the processor, causes the processor to carry out a method comprising:

receiving tag data identifying an electronic wireless tag placed on a distinct device by the receiver of the head-mounted device, storing data comprising the tag data in the memory of the head-mounted device as stored data, identifying the distinct device based on the stored data, modifying the at least one function of the head-mounted device based on the stored data, the at least one function being an optical function of the controllable active optical lens, determining an activity of a wearer based on the stored data, the determined activity being stored in the memory of the head-mounted device so that the stored data is updated to further comprise activity data, and determining a determined angle between the head-mounted device and at least two electronic tags placed on the distinct device based on the received tag data, the determined angle being stored in the memory of the head-mounted device, so that the stored data is updated to further comprise the determined angle data, wherein the at least one modified optical function is an active dioptric function, and wherein, during the function modifying, the active dioptric function is modified to be adapted to the wearer based on the updated stored data.

12. A system comprising:

at least an electronic wireless tag, the at least one electronic wireless tag emitting an identifying wireless signal; and at least the head-mounted device according to claim 11.

13. The method according to claim 1, further comprising determining another angle between at least two receivers of the head-mounted device and an electronic tag placed on the distinct device based on the received tag data, the determined other angle being stored in the memory of the head-mounted device, so that the stored data is updated to further comprise the other angle data.

* * * * *